United States Patent [19]

Staats

[11] Patent Number: 5,092,519
[45] Date of Patent: Mar. 3, 1992

[54] CONTROL SYSTEM FOR WATER HEATERS

[75] Inventor: Charles W. Staats, Yeadon, Pa.

[73] Assignee: Bradford-White Corporation, Philadelphia, Pa.

[21] Appl. No.: 650,890

[22] Filed: Feb. 5, 1991

[51] Int. Cl.⁵ .......................................... B05B 17/08
[52] U.S. Cl. ..................................... 236/21 B; 236/23; 236/25 A; 392/345
[58] Field of Search ...................... 236/21 B, 25 A, 23; 219/330

[56] References Cited

U.S. PATENT DOCUMENTS 3,815,813  6/1974  Charron et al. ................. 236/23

FOREIGN PATENT DOCUMENTS 0007941  1/1981  Japan ........................... 236/21 B
8904442  5/1989  PCT Int'l Appl. ............ 236/21 B Primary Examiner—William E. Wayner
Attorney, Agent, or Firm—Austin R. Miller

[57] ABSTRACT

A control system for a gas water heater including a fuel rate control valve, a water flow switch to control the fuel rate valve, an inlet water temperature switch to reduce fuel flow when inlet temperature is high, a temperature switch at the water outlet to shut off fuel at a high temperature and a temperature sensor at the water outlet to regulate the fuel valve.

19 Claims, 7 Drawing Sheets

CONTROL SYSTEM FOR WATER HEATERS

BACKGROUND OF THE INVENTION

The present invention relates to a control system for instantaneous water heaters, particularly to improve the operating conditions of an instantaneous water heater when in use with single lever faucets and shower heads.

FIELD OF THE INVENTION

Gas water heaters, especially instantaneous gas water heaters, have had the difficulty of providing reliable control systems to insure that water to be heated by the water heater is heated under low flow conditions created by the use of single lever faucets or shower heads. To achieve this heretofore difficult goal effectively and continuously, it has been desirable to provide a system capable of accurately and reliably metering the flow of gas to the water heater burner to heat exact proportions of water to the desired temperature. Endeavors to date have not been entirely successful in providing a consistently reliable water heater apparatus capable of performing this task over extended periods of time.

These problems are particularly associated with the presently used state of the art instantaneous water heaters that perform their functions without the use of an external power source. For example, a single thermocouple is used in a manual process to maintain a small pilot flame used as the ignition source when gas is supplied to the burners for heating water. It does not provide enough energy, however, to operate the gas valve when a signal is received to heat water on demand.

A water pressure activated control system is typically used to provide this function. The deficiency in that approach is that there is frequently a water pressure gradient between cold and hot water lines at the point of use. This is highly disadvantageous in single lever faucets, shower heads and the like since water pressures in each line seek to balance one another at the mixing point. During balancing, diaphragms typically used in such systems incorrectly interpret reduced water flow in the hot water line as closing of the hot water faucet, thereby resulting in a signal to shut off or reduce the water heater burner. This is undesirable since the open hot water faucet is indeed calling for hot water. When a pneumatic pump tank system is used in homes with a well water supply, variations in the operating pressure between the on and off periods of the pump causes temperature fluctuations in hot water usage. In low water pressure the system will not function at all. The systems devised to date to resolve these persistent problems have been less than effective.

DESCRIPTION OF THE PRIOR ART

Many of the systems in the past have utilized water pressure activated diaphragm valve systems which have been notoriously poorly performing. They frequently are incapable of accurately metering the correct amount of water through the water heater inlet line and diaphragm life is limited. Also, they are especially prone to the water pressure gradient problems discussed above. Such systems are disclosed, for example, in U.S. Pat. Nos. 3,722,523 and 4,627,416.

The following patents relate to apparatus for heating water: U.S. Pat. Nos. 4,127,085; 4,147,159; 4,371,779; 4,501,261; 4,550,689 and 4,564,003.

'085 discloses an automatic water heater which operates in response to water usage. The water heater has a water pressure responsive switch connected to an electronic igniter and is actuated when a water faucet is opened. The electric igniter includes a spark coil, a transformer, an electrical circuit and a spark plug connected to ignite gas from the burner. The electric igniter is also connected to an electrical power source by a control assembly. A solenoid control valve actuates gas applied to the burner and includes a time delay element.

'159 relates to an instantaneous water heater having an external power supply to provide electrical power to a solenoid. The solenoid is actuated by a pressure responsive switch in a cold water pipe. An electric igniter is connected to an outside electrical power source and ignites gas supplied by the burner. The temperature of the exiting water is detected by a hot water sensor, which also controls the burner.

'779 discloses a control circuit for water heaters including a water flow detector connected to a cold water inlet pipe to detect flow of water into a water tank. An electric heating element is activated in response to closing of a contact upon extation of the coil. The coil reacts to closing of a contact device and responds to the water flow detector.

'261 discloses an instantaneous gas water heater connected to a cold water supply pipe having a temperature sensor and a flow sensor. The flow sensor, inlet water temperature sensor, a solenoid valve, a proportional valve, a hot water temperature and hot water valve are electrically connected to a temperature device.

'689 discloses a similar instantaneous water heater having a switch which may be flow or electrically actuated and is connected to an electric igniter. The igniter is connected to a 12 volt battery to receive its electrical supply.

'003 discloses a combination solar and gas water heater. A gas valve controls a pilot and main gas supply and a temperature sensing unit sensing outgoing hot water. A motorize control varies the supply of gas in response to the hot water temperature. The system receives its power from rechargeable batteries.

Other patents in the field include U.S. Pat. Nos. 4,055,164; 4,535,931; 4,638,944; 4,699,122 and 4,768,947.

OBJECTS OF INVENTION

It is an object of the present invention to provide an instantaneous water heater capable of continuously heating water on the run, having a control system which accurately and reliably controls the amount of gas supplied to a burner in proportion to the amount of water flowing, and to do this over extended periods of time, and which is free of dependence on burner activation by water pressure changes and a self contained power supply.

It is another object of the present invention to provide a control system for a gas water heater which is capable of sensing the temperature of exiting hot water to prevent excessively heated water from exiting to end points in a water supply system, and which is not affected by water line pressure gradients.

It is an important object of the present invention to provide a system which includes safety features automatically operative in the event that the water heater thermostat and/or water flow detector become defective or inoperative.

It is a further object of the present invention to provide a system which enables a gas fuel water heater to be capable of self-sufficient operation without connection to an electrical supply.

Other objects and advantages of the present invention will become apparent to those skilled in the art from the drawings, the detailed description of preferred embodiments and the appended claims.

SUMMARY OF THE INVENTION

The present invention provides a control system for instantaneous water heaters including a gas control valve connected to a gas supply and a burner in the water heater. A pilot burner connects to the gas control valve and is located adjacent to the burner to supply an ignition flame to the burner. Electric supply means such as a thermopile or the like is preferably connected to the gas control valve and is located adjacent to the pilot burner to provide electrical energy for the system.

In an instantaneous water heater according to this invention a water flow switch positioned on the water inlet and connected to the gas control valve detects the flow of water through the water inlet. The water flow switch closes a circuit upon detection of water flow, thereby causing the gas control valve to supply gas to the main burner and heat the flowing water.

An outlet water cut-off switch is located in a position to detect the temperature of water in the hot water outlet receiving hot water from the heat exchanger in the water heater. The outlet water cut-off switch is connected to the gas control valve and serves to break the circuit and cause the gas control valve to cut the supply of gas to the main burner if the detected temperature of the water in the hot water outlet exceeds a predetermined temperature.

An inlet water cut-off switch is connected between the gas control valve and the water flow switch and is located in a position to detect the temperature of water in the water inlet. (If the water faucet is shut off and the flow switch fails, the burner will continue to heat the water. Since hot water expands when heated it can only expand back to the supply source.) The inlet switch is connected to break the circuit if the detected temperature of the water in the cold water inlet line exceeds a predetermined temperature, thereby causing the gas control valve to cut the supply of gas to the main burner.

A thermostat is connected to the gas control valve and senses the temperature of the heated water. The thermostat regulates the rate of fuel supply to the main burner depending on the sensed temperature of the heated water.

DETAILED DESCRIPTION OF THE INVENTION

Figure 1:
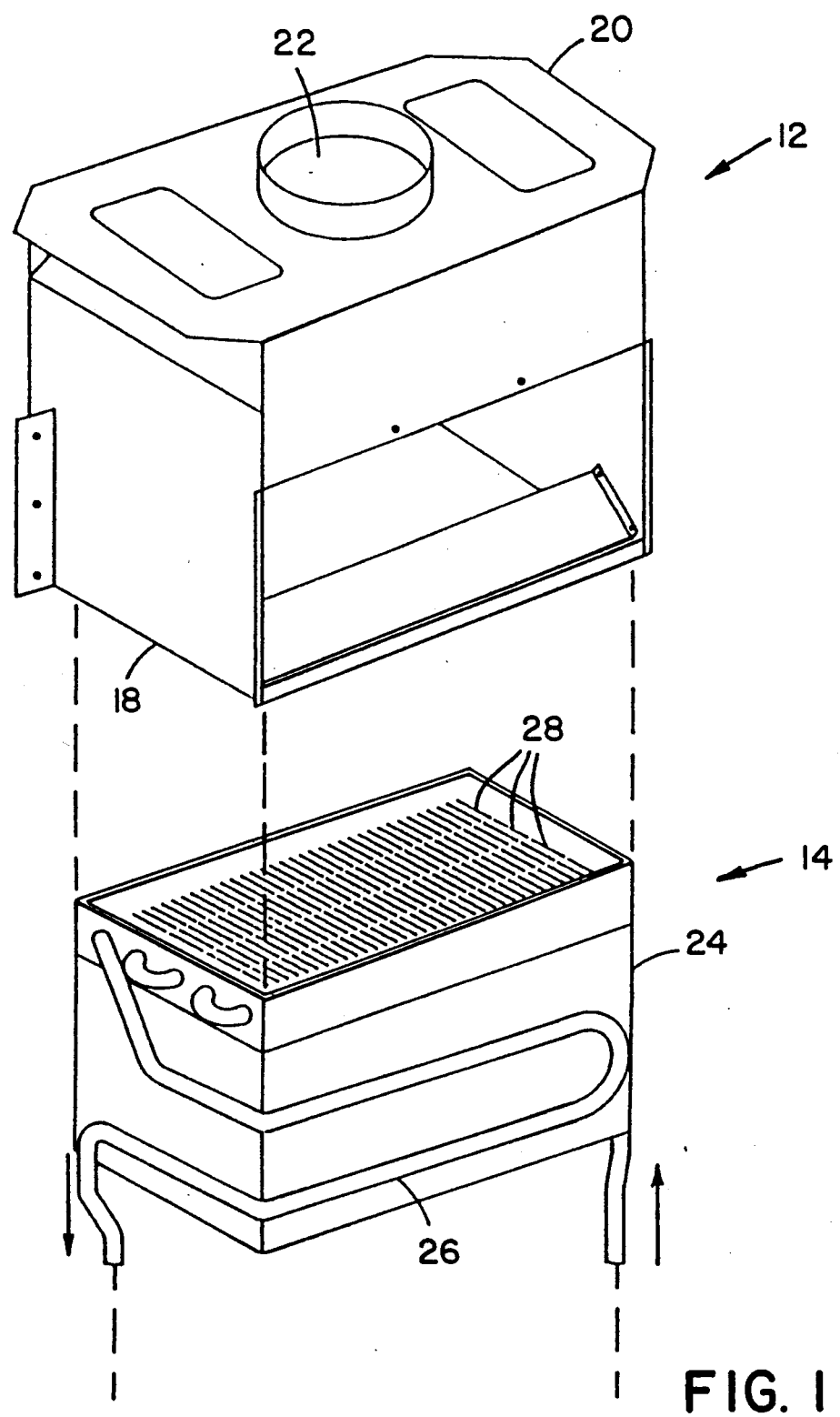
FIG. 1 is a schematic perspective view of working portions of one embodiment of an instantaneous gas water heater according to this invention.

It will be appreciated that the following description is intended to refer to the specific embodiment of the invention selected for illustration in the drawings and is not intended to define or to limit the scope of the invention, which is defined in the appended claims.

Turning now to the drawings in general and FIG. 1 in particular, the primary interior working components of an instantaneous gas water are shown. The water heater consists of several primary components such as draft hood assembly 12 and heat exchanger assembly 14. Draft hood assembly 12 consists primarily of a flue gas collection chamber 18 and flue gas exit plate 20 having an exhaust hole 22. Heat exchanger 14 includes an outer casing 24 containing water pipe 26 and a multiplicity of heat exchange fins 28.

Figure 2:
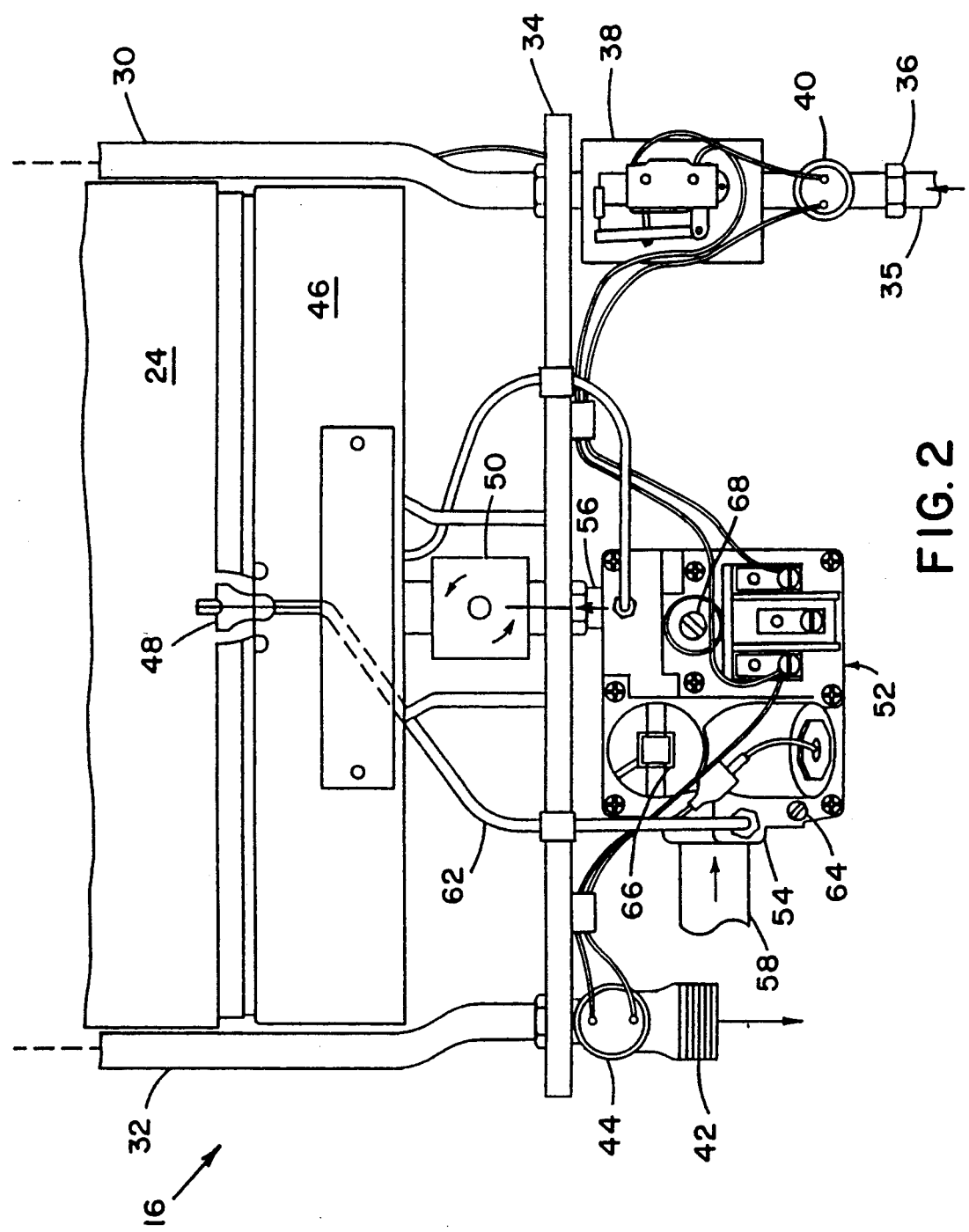
FIG. 2 is an exploded schematic front elevational view of a control system of the invention which connects to the working portions shown in FIG. 1.

Referring now to FIG. 2, burner and control assembly 16 connects to heat exchanger assembly 14 of FIG. 1 by water inlet line 30 and heated water outlet line 32 as indicated by the dashed lines spanning FIGS. 1 and 2 and supported on base plate 34. Water inlet line 30 terminates at a coupling 36 which connects to a water supply line 35. A water flow switch 38 is also connected to water inlet line 30, just below base plate 34. A first cutoff switch 40 is positioned on water inlet line 30. Similarly, heated water outlet line 32 terminates at coupling 42 and has a second cutoff switch 44 located below base plate 34.

Main burner 46 is mounted on supports extending above the top of base plate 34 and is located between water inlet line 30 and heated water outlet line 32. Pilot burner 48 extends upwardly from the middle portion of main burner 46. Thermostat 50 is located between gas valve 52 and main burner 46.

Gas control valve 52 is located underneath base plate 34 and between couplings 36 and 42. Gas control valve 52 has a gas inlet 54 and a gas outlet 56. Gas inlet 54 connects to a gas supply line 58 and gas outlet 56 connects to thermostat 50. Thermostat 50 connects to main burner 46.

Pilot gas supply tube 62 connects between gas control valve 52 and pilot burner 48. Gas supply valve 52 also has a pilot adjustment switch 64 and a control switch 66 having "off", "pilot" and "on" settings. Gas control valve 52 also contains a main gas pressure regulator 68.

Figure 3:
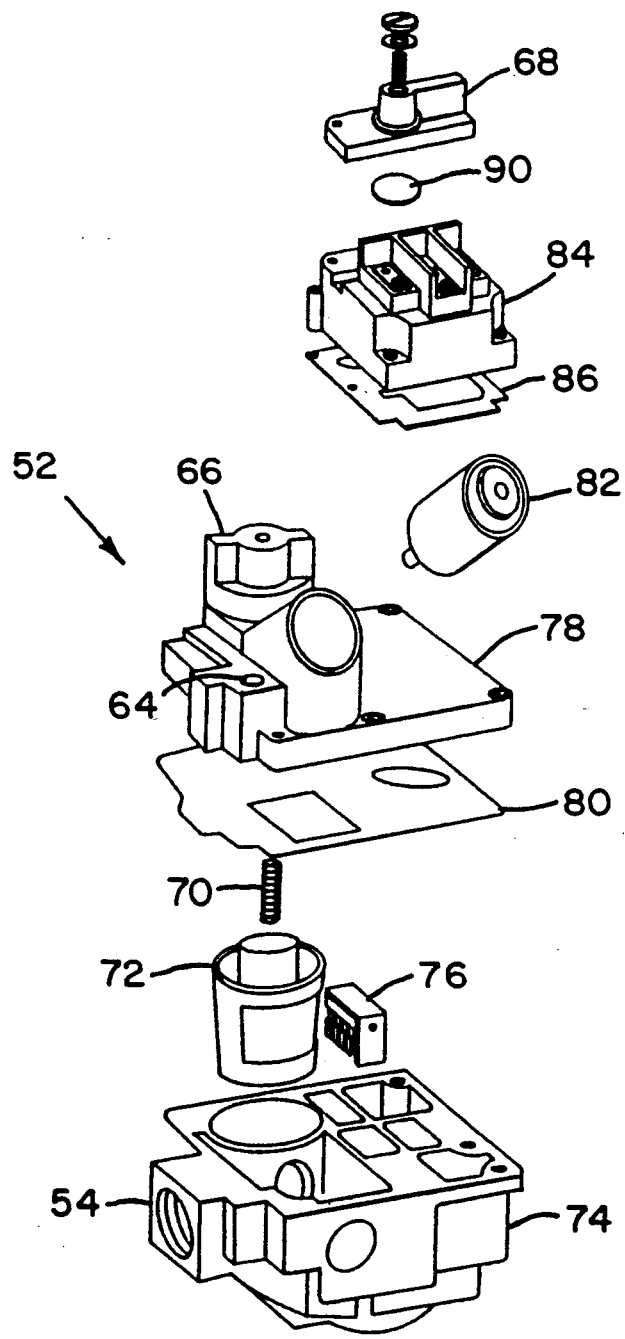
FIG. 3 is a perspective view from above of a typical gas control valve, with its primary components broken apart for ease of understanding, utilized in accordance with one embodiment of the invention.

FIG. 3 shows a typical gas control valve 52 broken apart into its primary component pieces. Various gas control valves are available from several known manufacturers and may be substituted for the one illustrated and described herein. It should be appreciated that other gas control valves may be substituted as full equivalents and are fully interchangeable. Gas cock spring 70 is located in gas cock plug 72, which is seated inside body 74. Pilot filter 76 similarly is seated inside body 74. Cover 78 connects to body 74 with a gasket 80 providing a seal between them. Pilot adjustment switch 64 is mounted on cover 78 and control switch 66 is similarly mounted on cover 78. Magnetic actuator coil 82 is still further mounted into cover 78. Magnetic actuator coil 84 is connected to cover 78 with a gasket 86 providing a seal between them. Regulator 68 connects to the top of actuator 84 with a gasket 90 providing a seal between them.

Figure 4:
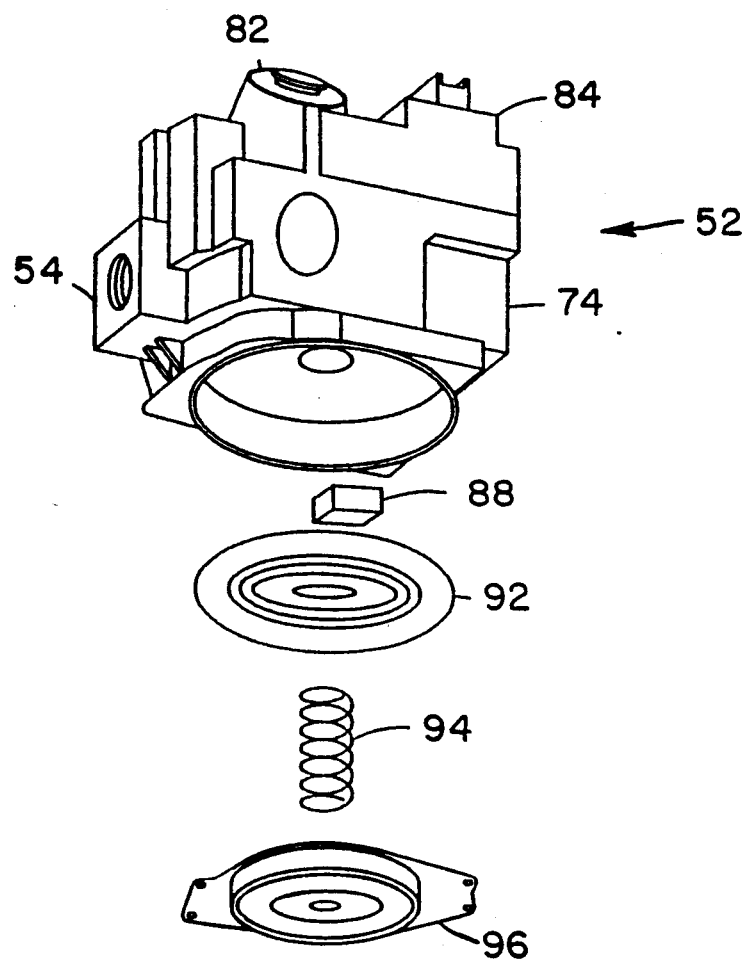
FIG. 4 is a perspective view from below of the gas control valve of FIG. 3 with its primary components broken apart for case of understanding.

FIG. 4 shows gas control valve 52 from its underside wherein body 74 has a bleed gas filter 88, a diaphragm valve assembly 92, a valve spring 94 and bottom cover 96.

Figure 5:
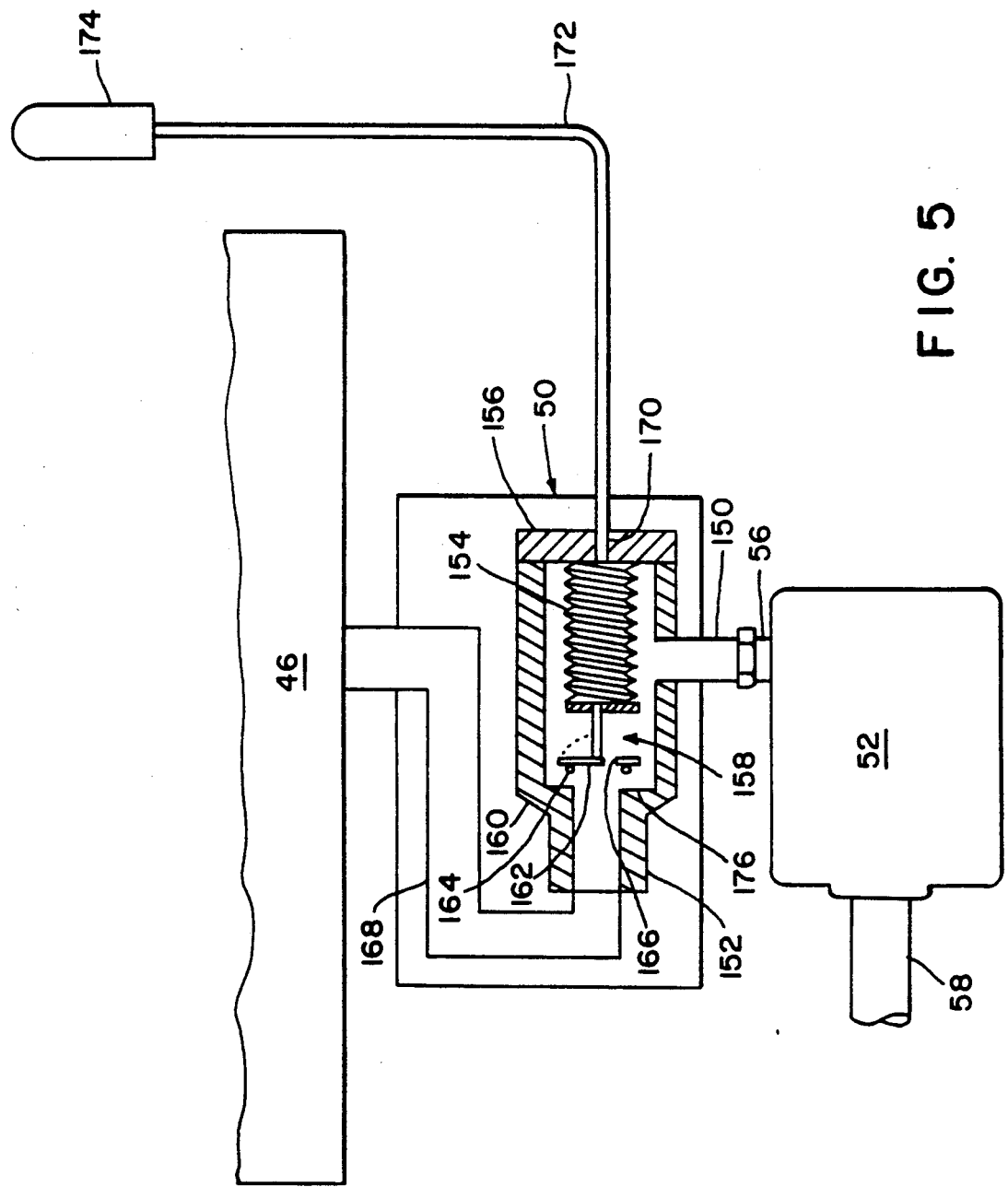
FIG. 5 is an exploded schematic front elevational view of a thermostat, taken partially in section, in conjunction with the valve of FIG. 3 and 4 and a burner.

FIG. 5 shows thermostat 50 connected to gas control valve 52 and burner 46. Gas outlet 56 connects to thermostat inlet 150, which leads to thermostat housing 152. Bellows 154 connects on one end to housing end plate 156 and on the other end to plunger 158. Plunger 158 consists of rod 160, seal plate 162 and o-ring 164. Seal plate 162 contains orifice 166. Thermostat housing 152 also has a seat 176 and connects to burner supply line 168 to supply gas to burner 46. Housing end plate 156 has a hole 170 through which capillary 172 connects to bellows 154. Capillary 172 connects to a temperature sensing bulb 174 which extends into heat exchanger 24 from FIG. 1 and in between heat exchange fins 28, also shown in FIG. 1.

Figure 6:
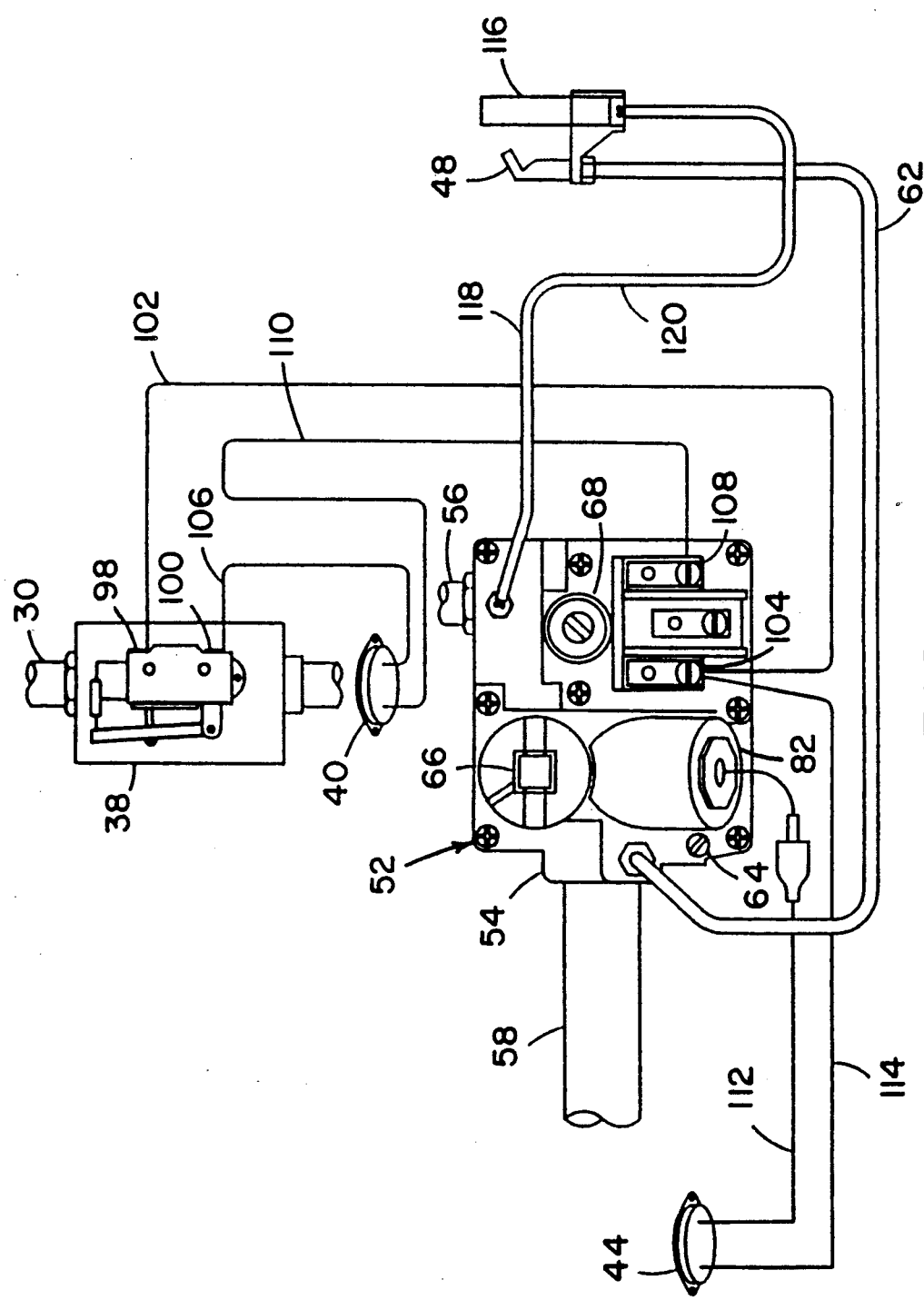
FIG. 6 is the valve of FIGS. 3 and 4 connected to a gas supply line, a burner supply line, a pilot burner and associated electrical components.
Figure 7:
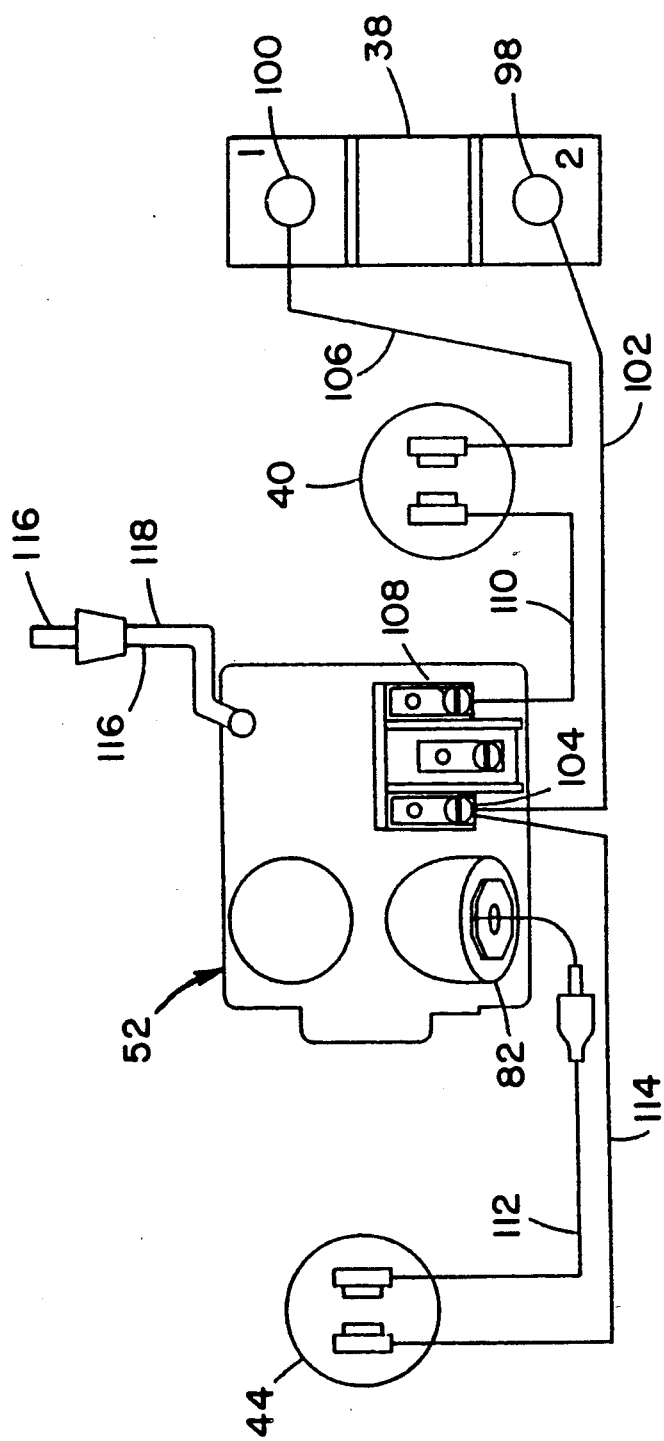
FIG. 7 is a schematic wiring diagram of an electrical circuit showing aspects of the invention.

FIGS. 6 and 7 show gas control valve 52 of FIGS. 3 and 4 connected to various components of the water heater system. Alternative gas control valves may be substituted for the valve illustrated in FIGS. 3 and 4 and connected to the various components of the water heater. Flow switch 38 having contacts 98 and 100 connects to gas supply valve 52. Contact 98 is connected to wire 102 which connects to actuator post 104. Contact 100 connects to first cutoff switch 40 by wire 106. First cutoff switch 40 connects to gas supply valve 52 at actuator post 108 by wire 110.

Similarly, second cutoff switch 44 connects to gas supply valve 52 at magnet assembly 82 by wire 112 on one end and by wire 114 on the other end, which connects to actuator post 104.

In FIG. 6, pilot burner 48 connects to pilot gas supply tube 62 which connects to gas control valve 52. Thermopile 116 connects to gas control valve 52 by wires 118 and 120.

Referring now to the drawings in general, operation of the control system will now be described. Water heaters of the type depicted in the drawings, such as gas instantaneous water heaters, produce heated water on demand and do not typically store heated water in a large tank or reservoir. Thus, it is important to precisely control the flow and temperature of water as it exits the water heater. When water is demanded at an end point, such as a shower, sink faucet or the like, water exits the water heater through heated water outlet line 32. This in turn causes water to move through water heating pipe 26 and water inlet line 30.

Movement of water through water inlet line 30, which occurs substantially simultaneously with movement of water through heated water outlet line 32 and water heating pipe 26, causes water to move past water flow switch 38. Flow of water past switch 38, such as one gallon per minute, for example, causes contacts 98 and 100, which are normally open, to close. Closing contacts 98 and 100 completes an electrical circuit through wires 106 and 110 to energize magnetic actuator coil 84 in gas control valve 52. The completed circuit causes magnetic actuator coil 84 to energize and move diaphragm valve assembly 92 into an "open" condition, which permits flow of gas into inlet 54 from gas supply line 58 and outwardly through outlet 56, thermostat inlet 150, thermostat 152, burner supply line 168 and into main burner 46.

Gas emerging from main burner 46 is ignited by a flame at pilot burner 48. Pilot burner 48 normally burns continuously through supply of gas through pilot gas supply tube 62, which is received from control valve 52. Heat generated from main burner 46 is conducted to the water to be heated through heat exchanger 14. This heated water passes into heated water outlet line 32 and into the ultimate pipe supply system (not shown) and toward the end use point.

Temperature sensing bulb 174 detects the temperature of water as it flows through heat exchanger 14. Increased temperatures result in expansion of gases within bulb 174, which expand through capillary tube 172 and into bellows 154. Increased flow of gases into bellows 154 causes bellows 154 to expand and push plunger 158 toward seat 176. Movement of plunger 158 toward seat 176 reduces the space available between o-ring 164 and seat 176 for flow of gas to burner 46, thereby reducing the flame on burner 46 and the amount of available heat for transfer to the water. Contact of o-ring 164 with seat 176 effectively shuts off the supply of gas to burner 46. However, orifice 166 provides for a very small quantity of gas to flow into burner 46, thereby maintaining a small flame. In this way, thermostat 50 regulates the amount of fuel supplied to burner 46 in response to the sensed temperature. This regulates the amount of heat transferred to the water. Thermostat 50 modulates the supply of fuel as the water temperature approaches a predetermined temperature, such as 140° F., for example, to control the amount of temperature rise. When water flow is reduced to, for example, one half gallon per minute, or if water flow is stopped completely, contacts 98 and 100 open and break the electrical circuit to the control valve 52, thereby shutting the flow of gas to thermostat 50 and burner 46. However, thermostat 50 does not control pilot gas supply tube 62 and it continues to supply gas to pilot burner 48. Failure of thermostat 50 to control the increased temperature of water beyond the predetermined level for any reason causes either or both of cut-off switches 40 and 44 to open, thereby breaking the electrical circuit to gas valve 52. The broken circuit causes gas valve 52 to close the supply of gas to pilot burner 48 and main burner 46 to achieve 100% safety. The pilot burner 48 must then be reset after investigation and/or repair of the problem before normal operation can begin again.

Water temperature is controlled by thermostat 50 and the heating rate is significantly influenced by water flow rates. Flow rate is, of course, controlled by the user who manipulates a conventional hot water faucet, shower faucet or the like. Increased water flow requires more heat; otherwise it would tend to lower the heated water temperature. Therefore, thermostat 50 increases the gas flow to maintain a steady predetermined temperature. Thermostat 50 automatically reduces the supply of fuel to burner 46 when necessary to maintain a steady water temperature when the water inlet temperature and flow rate are in a steady state condition. Also, thermostat 50 provides for rapid response to sudden increased need for heated water by maintaining a small flame on burner 46. Orifice 166 permits a small amount of gas to flow to burner 46 so long as any amount of water is flowing. Upon a sudden call for more heated water, the small flame virtually instantly increases to a large flame upon movement of bellows 154 and separation of o-ring 164 and seat 176. This avoids having to wait for an initial supply of gas to reach pilot burner 48 which would cause colder water to flow to the point of use until heating occurred.

Because of the unique and advantageous features of this invention, the temperature of the flow of water passing through water inlet line 30 and heated water outlet line 32 is continuously monitored and controlled to maintain it within predetermined parameters. The temperature of water in water inlet line 30 is monitored by first cutoff switch 40, which is set at a predetermined temperature. In the event that the temperature of the water in water inlet line 30 exceeds that predetermined temperature, first cutoff switch 40 breaks the circuit in wire 106 leading from flow switch 38 to wire 110 which leads to gas control valve 52.

When the electrical circuit is broken, this de-energizes magnetic actuator coil 84 and causes the supply of gas to main burner 46 to be cut off. This feature contributes to the extraordinary safety of water heater 10. One example of an event triggering the presence of heated water in water inlet line 30 is failure of flow switch 38 coupled with closing a faucet. This would normally result in the burner continuing to heat water having a closed exit, which would result in heated water expanding back to the water supply source.

Similarly, the temperature of water flowing through heated water outlet line 32 is monitored by second cutoff switch 44. In the event that the temperature of water exiting heated water outlet line 32 exceeds a predetermined temperature, second cutoff switch 44 breaks the electrical circuit between wire 114 and wire 112. Breaking this circuit causes magnetic actuator coil 84 to deenergize in a similar manner as described with regard to the operation of first energy cutoff switch 40. One example of an event which could cause excessively hot water to be present in heated water outlet line 32 would be a defective thermostat 50 which, for example, might incorrectly continuously supply excessive fuel to burner 46. This could result in dangerously hot water reaching a point of use. Second cut-off switch 44 eliminates that possibility.

First cutoff switch 40 may be of various known types and may be set at a variety of temperatures. However, 120° F. is one preferred setting for this switch. Such a setting insures that in the event of flow switch failure in the system that the main burner 46 will be turned off. Similarly, second cutoff switch 44 may be of various known types and may be set at any number of temperatures. However, 175° is one most preferred temperature. This temperature provides sufficient tolerance to prevent the water from converting into steam. Temperatures in excess of 175° F. are typically not necessary and can become dangerous as they increase. Accordingly, it is important to have a precise and reliable manner and apparatus of preventing water exiting hot water heater 10 having temperatures in excess of those set. In the event that thermostat 50 is defective or water flow is decreased, and the water temperature increases beyond the predetermined level, second cutoff switch 44 will trigger closing of gas control valve 52 which shuts off main burner 46.

A continuous supply of electricity can, of course, be provided from any conventional domestic electric wiring but preferably is generated by thermopile 116 to power the functions of the water heater. Thermopile 116 receives heat energy from the flame generated by pilot burner 48, which is constantly burning, and in a known manner converts a portion of that heat energy into electrical energy. Numerous thermopile devices are commercially available and may be used herein. Typically, thermopile 116 is capable of generating about 350 mv. This electrical energy is supplied to gas control valve 52 by wires 118 and 120. Thermopile 116 provides a continuous source of electricity to the entire electrical system connected to gas control valve 52. This permits operation of water flow switch 38 and cutoff switches 40 and 44. It further provides electrical energy for magnetization/activation and demagnetization/deactivation of magnetic actuator coil 84.

Constant generation of electrical energy by the thermopile provides the advantage over other systems requiring either a hard wire connection to the electrical system of the building in which water heater 10 is located or connection to a battery source. The disadvantages of connections to batteries are clearly evident. Moreover, connection to the electrical system of a residence or other building precludes use of water heater 10 when the electric supply is disconnected or discontinued from the building in which water heater 10 is located.

The pilot system described herein provides further safety advantages in that in the event the flame on pilot burner 48 is extinguished, magnetic actuator coil 82 de-energizes, thereby shutting off the gas supply at gas control valve 52. The pilot flame must be reset prior to use of the water heater.

The water heater and control system described and claimed herein provide numerous advantages over the prior art. For example, the gas control feature of the invention combines a manual main and pilot gas valve, a separate automatic safety pilot valve, a pilot adjustment feature, a pilot and main gas filtration and a main pressure regulator. Also, numerous component parts essential to operation of prior art water heaters are eliminated. For example, the usual safety control valve and switch, diaphragm and diaphragm housing assembly, water sensing tubes and connections, piezo igniter, igniter starter and stop buttons and connections, gas pressure regulator and valve, venturi and throttle are all not necessary in the invention.

Thermopile 116 provides the electrical energy necessary to operate all or any part of the control system without the need of an outside electrical source. The term "thermopile" is, of course, intended to be broadly interpreted to include any device for converting heat energy into electrical energy.

The use of a water flow actuated switch which is responsive to flow or change of rate of flow eliminates the need for a diaphragm operated gas valve requiring a water pressure drop in the water inlet to control the system as is used in other systems. The flow switch also contains an adjustable flow rate for "on" and "off" actuation. This provides a more reliable system control when being used with single lever faucets and shower heads. The terms "water actuated flow switch", "water flow switch" and "flow switch" are intended to be interpreted to include devices relying on water movement and not changes in water pressure and may be of several types such as piston, float, paddle or the like operated.

With water pressure drop not being required to operate the system, full flow capacity can be obtained at the final use points. Single lever faucets and shower heads become the final adjustment points for water temperature control.

Although this invention has been described in connection with specific forms and embodiments thereof, it will be appreciated that many equivalents may be substituted for the specific elements shown and described herein, and that parts may be reversed and change may be made in the sequence of method steps, all without departing from the spirit and scope of this invention as described in the appended claims.

I claim:

1. A water heater including
a water inlet, a heat exchanger arranged to heat water from the water inlet, a fuel burner connected to heat water in the heat exchanger, the heat exchanger being connected to a heated water outlet, and a control system for controlling said water heater, said control system comprising:
a fuel rate control valve connected to the fuel burner to control the rate of flow of fuel to the burner;
a flow responsive switch connected to detect flow of water in said water heater therethrough and to regulate said fuel rate control valve in response to water flow;
an incoming water responsive energy reducing switch connected to said water inlet for detecting the temperature of incoming water for reducing the supply of fuel to the burner when the sensed temperature of incoming water exceeds a predetermined level;
a heater water responsive energy reducing switch connected to said heated water outlet for detecting the temperature of heated water for closing the supply of fuel to the burner when the sensed temperature of heated water exceeds a predetermined level;
a pilot burner connected to the fuel rate control valve and located to ignite fuel in the fuel burner;
and a temperature sensing means connected to said fuel rate control valve and also connected to sense the temperature of heated water and cause the fuel rate control valve to regulate the rate of fuel supplied to the fuel burner in response thereto.

2. The heater defined in claim 1 wherein the predetermined level of the incoming water responsive energy reducing switch is about 120° F.

3. The heater defined in claim 1 wherein the predetermined level of the heated water responsive energy reducing switch is about 175° F.

4. The heater defined in claim 1 further comprising a pilot burner adjustment control connected to the pilot burner.

5. The heater defined in claim 1 further comprising means for regulating the pressure of gas flowing to the fuel burner.

6. The heater defined in claim 1 further comprising a gas supply control valve connected to said fuel rate control valve and in between i) said fuel control valve and said incoming water responsive energy switch, ii) said fuel rate control valve and said heated water responsive energy reducing switch and iii) said fuel rate control valve and said flow responsive switch.

7. The heater defined in claim 1 further comprising a pilot burner on-off control switch connected to the pilot burner.

8. The heater defined in claim 1 wherein the fuel rate control valve is connected to regulate the pressure of gas flowing to the fuel burner.

9. The heater defined in claim 1 wherein the flow responsive switch includes a pair of electrical contacts which are connected to close upon movement of water in the water inlet and to open when there is no movement of water in the water inlet.

10. The heater defined in claim 1 further comprising an energy converter located to receive heat energy generated by the pilot burner and to convert at least a part of the heat energy to electrical energy, the energy converter being connected to supply electrical power to at least one of said valves or switches.

11. An instantaneous gas water heater comprising:
a water inlet connected to supply water to a heat exchanger;
a gas supply control valve connected to a gas supply and a main burner in the water heater, said main burner being positioned to supply heat to said heat exchanger to heat the water;
a gas flow rate control valve connected between the gas supply control valve and the main burner to control the rate of flow of fuel to the main burner;
a pilot burner connected to the gas control valve and located adjacent the main burner to supply an ignition flame to the main burner;
a flow detection switch connected to the gas control valve and positioned at a water inlet location to detect flow of water therein and, upon detection of water flow, to cause the gas control valve to supply gas to the main burner;
a first cut-off switch connected between the gas control valve and the water flow detection switch and located in a position to detect the temperature of water in the area of said water inlet and to break the circuit if the detected temperature of the water in the water inlet exceeds a predetermined temperature, thereby causing the gas supply control valve to reduce the supply of gas to the main burner;
a second cut-off switch connected to the gas control valve and located in a position to detect the temperature of water in a water outlet receiving water from the heat exchanger and being capable of breaking the circuit and causing the gas supply control valve to reduce the supply of gas to the main burner if the detected temperature of heated water in the hot water outlet exceeds a predetermined temperature; and
sensing means positioned adjacent said heat exchanger and connected to detect the temperature of the heated water and to cause the gas flow rate control valve to regulate the rate of fuel supplied to the main burner.

12. The system defined in claim 11 further comprising a thermopile connected to the gas control valve and located adjacent the pilot burner to receive and convert at least a portion of ignition flame into electrical energy for the system.

13. The system defined in claim 11 wherein the predetermined temperature of the first energy cut-off switch is about 120° F.

14. The system defined in claim 11 wherein the predetermined temperature of the second energy cut-off switch is about 175° F.

15. The system defined in claim 11 further comprising a pilot adjustment control connected to the gas control valve.

16. The system defined in claim 11 further comprising a pilot burner on-off control switch connected to the gas control valve.

17. The system defined in claim 11 wherein the gas supply control valve regulates the pressure of gas flowing from the gas supply to the main burner.

18. The system defined in claim 11 wherein the flow detection switch includes a pair of contacts which close to complete the circuit upon movement of water in the water inlet and open to break the circuit when there is no movement of water in the water inlet.

19. A control system for an instantaneous water heater having a water inlet, a fuel burner to heat water in a heat exchanger entering through the inlet and a hot water outlet comprising:
- a first valve connected to the burner to control the rate of flow of fuel to the burner;
- a second valve connected to the first valve and a fuel supply to supply fuel to the burner;
- a water actuated flow switch connected to the water inlet to detect passage of water therethrough and actuate the second valve upon detection of water flow;
- a first cut off switch electrically connected between the second valve and the flow switch and being capable of detecting the temperature of water in the water inlet and causing the second valve to close if the sensed temperature of water in the water inlet exceeds a predetermined level;
- a second energy cut off switch electrically connected to the second valve and being capable of detecting the temperature of water in the hot water outlet and causing the second valve to close if the sensed temperature of the water in the hot water outlet exceeds a predetermined level;
- a pilot burner located adjacent the fuel burner to ignite fuel in the fuel burner upon activation of the valve switch;
- a thermopile electrically connected to the second valve and located adjacent the pilot burner to receive and convert at least a portion of heat energy generated by the pilot burner to electrical energy to supply power to the control system; and
- a temperature sensor connected to the first valve which senses the temperature of the heated water and causes the first valve to regulate the rate of fuel supplied to the main burner.

* * * * *